United States Patent Office 2,910,459
Patented Oct. 27, 1959

2,910,459

ADDITION-TYPE COPOLYMERS HAVING EXTRA-LINEAR GLYCIDYL AND AMINO GROUPS AND PROCESS FOR THEIR PREPARATION

Henry Shirley Rothrock and Charles William Tullock, Wilmington, Del., assignors to E. I. du Pont de Nemours and Company, Wilmington, Del., a corporation of Delaware No Drawing. Application April 1, 1955
Serial No. 498,766

5 Claims. (Cl. 260—86.1)

This invention relates to new polymers and their preparation, and, more particualrly, to soluble addition-type polymers containing extralinear glycidyl and amino groups adapted to be crosslinked upon heating and to a process for preparing these polymers.

This application is a continuation-in-part of applicants' Serial No. 415,681, filed March 11, 1954, now abandoned.

It has recently been found that partial amination of linear polymers containing extralinear oxirane

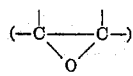

groups produces products which are valuable as coating and impregnating compositions for metals, wood, textiles, paper, etc., as adhesives, dispersing agents for waxes and oils, as binders for printing inks and paints, and in many other applications. These products are linear polymers containing extralinear oxirane groups, hydroxyl groups and extralinear primary, secondary or tertiary amino groups. They have been prepared by reacting a linear polymer bearing extralinear oxirane groups with ammonia or a primary or secondary amine in amount insufficient to react with all the oxirane groups, whereby a portion of the latter is converted to hydroxyl and amino groups, as illustrated by the scheme.

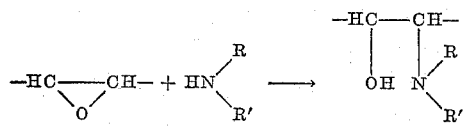

where R and R' are hydrogen or organic radicals.

The preparation of polymers containing both oxirane and amino groups by amination of a preformed oxirane-containing polymer is not free from disadvantages. Polymers so obtained necessarily have as many hydroxyl groups as amino groups when there is no crosslinking, and the number of hydroxyl groups is further increased if crosslinking occurs, as a hydroxyl group is formed along with each crosslink. Such a large number of hydroxyl groups increases the water sensitivity and is undesirable for many uses, as when maximum resistance to water sensitivity is required in coating. The method requires two separate steps, viz., polymerization of the unsaturated oxirane monomer, followed by amination. The latter step must be carefully controlled in order to produce the desired degree of amination while avoiding premature crosslinking of the residual oxirane groups with the amino groups formed in the polymer.

An object of the present invention is to provide a new class of soluble, linear, i.e., non-crosslinked polymers which may be crosslinked readily to an insoluble condition. A further object of the invention is to provide a direct and economical process for preparing these soluble polymers from monomers. Other objects will become apparent from the description of the invention given hereinafter and the claims.

The above objects are accomplished according to the present invention by heating together in a homogeneous, one-phase system in the presence of an azo polymerization initiator at a temperature below about 120° C., a polymerizable mixture, the polymerizable ingredients of which are all monoethylenically unsaturated compounds and comprise, by total weight of said polymerizable ingredients, from 0.5% to 99% of a compound having a terminal glycidyl group

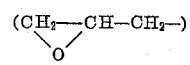

attached to a terminal methylene group through an aliphatic group of one to three carbon atoms containing an oxygen linkage (ether or ester) in the chain connecting the terminal groups, and from 0.5% to 99% of a monoethylenically unsaturated monoamine having a basicity expressed by a pK base value below 6.0. The invention further comprises, as a new class of soluble addition-type copolymers composed of substituted hydrocarbon chains, free of hydroxyl groups and adapted to be crosslinked to an insoluble condition upon heating, the copolymerization products of a terminal glycidyl group-containing compound of the class specified above and of a polymerizable amine having a basicity expressed by a pK base value below 6.0.

According to this invention, the polymerizable mixture contains two essential polymerizable ingredients, one of which is a monoethylenically unsaturated compound of the class described containing a terminal glycidyl group, and the other of which is a monoethylenically unsaturated monoamine having a pK base value below 6.0. It has been found, despite the fact that the monoamine in the polymerizable mixture is one of strong basicity, that the mixture can be polymerized, in a homogeneous, one-phase system at a temperature below about 120° C. in the presence of one of the well-known class of azo polymerization initiators, to give a soluble, linear copolymer, that is, a copolymer composed of substituted hydrocarbon chains in which there has been no appreciable reaction between the glycidyl and amino extralinear groups.

The copolymers prepared according to the present invention are readily crosslinked, owing to the strong basicity of the monoamine component. Thus, these copolymers are well adapted to the formation of water- and organic solvent-resistant films and coatings.

The crosslinking referred to above results from the interaction between the glycidyl groups and the amino groups present in the copolymers, this interaction taking place when the copolymer is isolated and dried, especially upon heating at moderate temperatures, e.g., 50° to 150° C. The crosslinking mechanism presumably takes place according to the following scheme, where R is hydrogen or an organic radical, i.e., when primary or secondary amino groups are involved:

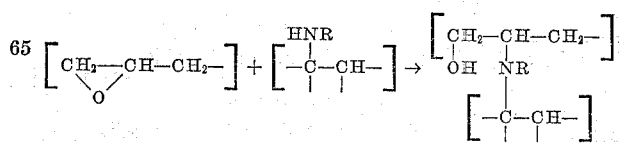

With tertiary amino groups, formation of quaternary ammonium crosslinks presumably takes place, in the presence of added or atmospheric water and/or acid such as carbonic acid, as illustrated by the scheme

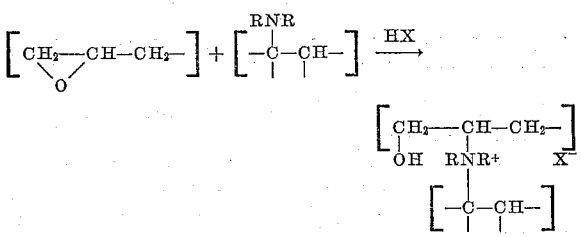

where R is an organic radical and X is hydroxyl or an anion. Because of this crosslinking reaction, the copolymers prepared in accordance with this invention, when air-dried and/or baked at elevated temperatures, are converted to films or coatings which are insoluble in, or highly resistant to water and organic solvents. It should be noted, however, that prior to crosslinking, that is, when kept in solution in a suitable solvent (e.g., an organic solvent or an aqueous acidic medium), these copolymers are quite stable and can be stored for long periods of time. Thus, they possess the great advantage of convenient handling and shipping without deterioration.

It will be apparent from the above discussion that the polymerizable monoamines suitable for use in this invention can be primary, secondary or tertiary. Many unsaturated monoamine compounds having acyclic amino nitrogen have been previously described and a number of them are specifically referred to in the examples and discussion which follow. A preferred class of monomers is represented by the formula

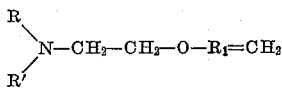

where R and R' are hydrogen or alkyl radicals, $R_1$ contains one to three carbon atoms and $-R_1=CH_2$ is a monoethylenically unsaturated acyl group or alkenyl group.

The polymerizable glycidyl group-containing compounds suitable for use in this invention are those in which a terminal glycidyl group is attached by a carbon-oxygen chain of atoms to a terminal vinylidene, including vinyl, group. A preferred class of monomers is represented by the formula

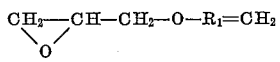

wherein $R_1$ contains one to three carbon atoms and $-R_1=CH_2$ is a monoethylenically unsaturated acyl group or alkenyl group, e.g., acrylyl, methacrylyl, allyl, or methallyl radicals.

The invention is illustrated in greater detail in the following examples, in which all proportions are by weight unless otherwise stated.

*Example I*

A solution of 80 parts of glycidyl methacrylate and 20 parts of beta-diethylaminoethyl methacrylate in 440 parts of benzene containing 0.5 part of alpha,alpha'-azobis(alpha,gamma-dimethylvaleronitrile) was heated at 49° C.–59° C. with stirring in a nitrogen atmosphere for six hours. Addition of the reaction mixture to diethyl ether caused precipitation of the glycidyl methacrylate/beta-diethylaminoethyl methacrylate copolymer, which was redissolved in benzene and reprecipitated in petroleum ether. The copolymer was redissolved in dioxane and kept in solution in that solvent. Evaporation of an aliquot of the dioxane solution indicated at 69% yield of copolymer. The dry material contained 1.56% nitrogen, corresponding to 20.5% of polymerized beta-diethylaminoethyl methacrylate. A test portion of the freshly precipitated polymer was readily soluble in 10% aqueous acetic acid.

A dioxane solution of this copolymer of about 15% concentration was completely stable after storing at room temperature for five months. In contrast, the solid polymer after standing at room temperature for seven days was no longer soluble in dioxane or acetone.

A film of this copolymer was insolubilized by heating at 102° C. for thirty minutes or at 145° C. for 22 minutes to yield a clear, hard composition. Similarly, films cast from aqueous acetic acid and heated at 102° C. to 117° C. for thirty minutes were clear and insoluble.

*Example II*

A solution of 18.5 parts of beta-diethylaminoethyl methacrylate and 14.2 parts of glycidyl methacrylate in 175 parts of benzene containing 0.17 part of alpha,alpha'-azobis(alpha,gamma-dimethylvaleronitrile) was heated at 48° C. to 56° C. with stirring in a nitrogen atmosphere for four hours. The glycidyl methacrylate/beta-diethylaminoethyl methacrylate copolymer was isolated by precipitation in petroleum ether and purified by redissolving it in benzene and reprecipitating with petroleum ether. After drying at reduced pressure and room temperature, there was obtained 20.6 parts (63% yield) of copolymer. This material contained 5.86% oxirane oxygen, corresponding to 52% by weight of polymerized glycidyl methacrylate. The copolymer was initially soluble in acetone, dioxane, benzene and 10% aqueous acetic acid, but it slowly became insoluble on standing in the solid form at room temperature. Films of the copolymer were insolubilized by heating at 100° C. for twenty minutes. Much harder films were obtained by heating at 150° C.

*Example III*

Using essentially the procedure described in Example I, a glycidyl methacrylate/beta-diethylaminoethyl methacrylate copolymer was prepared from 20 parts of glycidyl methacrylate and 80 parts of beta-diethylaminoethyl methacrylate. This copolymer contained 5.75% nitrogen, corresponding to 76% by weight of polymerized beta-diethylaminoethyl methacrylate. Its dioxane solution was still stable after five months' storage at room temperature. On heating a film of this copolymer at 145° C. for 22 minutes, there was obtained a moderately tough, clear, soft, extensible film which was insoluble in dioxane at room temperature, although it was swelled by it.

*Example IV*

A solution of 14.2 parts of glycidyl methacrylate, 8.7 parts of beta-vinyloxyethylamine (B.P. 117° C. to 118° C.) (prepared by condensing acetylene at 200 lb./sq. in. pressure and 110° C. with monoethanolamine in the presence of potassium hydroxide catalyst) and 0.12 part of alpha,alpha' - azobis(alpha,gamma-dimethylvaleronitrile) in 150 parts of dioxane was heated at 53° C. for five hours in an agitated pressure vessel. The glycidyl methacrylate/beta-vinyloxyethylamine copolymer, obtained in 27.5% yield, was isolated by pouring the solution into diethyl ether and immediately redissolving the precipitated polymer in dioxane. Nitrogen analysis (0.95% nitrogen) of the dry product and neutralization equivalent of an aliquot of the solution showed that the material contained 5.9% by weight of polymerized beta-vinyloxyethylamine.

The freshly precipitated polymer was soluble in 10% aqueous acetic acid but it became insoluble in that solvent after standing at room temperature for 25 minutes, indicating rapid crosslinking. Dioxane solutions of the polymer remained clear for two days at room temperature before developing an opalescence; small amounts of highly swollen polymer separated from these solutions within three or four days. Solutions of the polymer in acetone containing sufficient acetic acid for neutralization remained stable for several weeks at room temperature.

Films prepared by casting dioxane solutions of the polymer at room temperature became insoluble as soon as the dioxane had evaporated, e.g., within 30 to 60 minutes. These films were unaffected by dioxane, ethanol or benzene at room temperature. They were softened but not spotted by warm water, and they were only softened by 10% aqueous potassium hydroxide and 10% hydrochloric acid at room temperature in 30 minutes. However, films cast from an acetone solution of the polymer neutralized with acetic acid did not crosslink with the same rapidity. Heat curing, e.g., at 158° C. for 10 minutes, was required to insolubilize these films.

*Example V*

An allyl glycidyl ether/beta-diethylaminoethyl methacrylate copolymer was prepared by slowly adding a solution of 25 parts of beta-diethylaminoethyl methacrylate, 58.5 parts of allyl glycidyl ether and 2 parts of 1,1-azodicyclohexane carbonitrile over a period of 1.3 hours to 117.5 parts of allyl glycidyl ether containing 2 parts of 1,1-azodicyclohexane carbonitrile and heated at 103° to 110° C. After addition was completed, the reaction mixture was heated for 1.5 more hours at 110° C. Upon removal of the excess allyl glycidyl ether by warming under reduced pressure, there remained 48.7 parts of the copolymer as a clear, brown, viscous syrup. This material contained 3.8% nitrogen, corresponding to 50% by weight of polymerized beta-diethylaminoethyl methacrylate. Dioxane solutions of the polymer were stable at room temperature but the polymer itself became insoluble after standing at room temperature for two days. Films of the polymer crosslinked on heating at 145° C. for 30 minutes to give clear, soft films insoluble in organic solvents.

*Example VI*

A solution of 49 parts of beta-dimethylaminoethyl methacrylate and 1 part of glycidyl methacrylate in 258 parts of dioxane containing 0.1 part of alpha,alpha'-azobis(alpha,gamma-dimethylvaleronitrile) was heated at 52° C. for six hours in a nitrogen atmosphere in an agitated pressure vessel. The beta-dimethylaminoethyl methacrylate/glycidyl methacrylate copolymer, obtained in 34% yield, was isolated by adding the solution to petroleum ether, redissolving the polymer in dioxane and reprecipitating it by addition of petroleum ether. Nitrogen analysis of the dry product (8.42% nitrogen) showed that the polymer contained 95% by weight of polymerized beta-dimethylaminoethyl methacrylate. On heating a film of this polymer at 130° C. for 25 minutes, there was obtained a tough, clear film swellable by water but insoluble in dioxane. This polymer, when applied to fabrics of polyhexamethylene adipamide, polyethylene terephthalate, and polyacrylonitrile, and cured by heating at 130° C. for 30 minutes, followed by washing in 0.5% soap solution at 65° to 70° C. for 2½ hours, was found to contribute good antistatic properties, as judged by conductivity measurements of the fabrics to an electric current.

*Example VII*

A solution of 10 parts of glycidyl methacrylate, 90 parts of beta-diethylaminoethyl methacrylate and 0.5 part of alpha,alpha'-azodiisobutyronitrile in 500 parts of dioxane was evenly divided among four pressure bottles which were flushed with nitrogen, capped and heated at 75° C. for six hours in a rotating cage immersed in a water bath. Dioxane and unreacted monomers were removed for the most part by warming at 60° to 65° C. under 15 to 20 mm. pressure, followed by warming at 100° C. under the same pressure. The polymer was purified by dissolving it in 70 parts of diethyl ether and pouring this solution into 400 parts of petroleum ether. The polymer, which solidified on cooling in a carbon dioxide/acetone bath, was redissolved in diethyl ether and precipitated a second time. The remaining polymer was dissolved in dioxane. Evaporation of a test portion of this solution showed that it contained 81 parts of a glycidyl methacrylate/beta-diethylaminoethyl methacrylate copolymer, which was found by oxirane oxygen determination to contain 3.2% by weight of polymerized glycidyl methacrylate. This copolymer crosslinked readily, either by heating at 132° C. for 30 minutes or by heating with a trace of phosphoric acid at 115° C. for forty minutes, to give a polymer which was no longer soluble in dioxane.

*Example VIII*

A solution of 175 parts of allyl glycidyl ether, 75 parts of beta-diethylaminoethyl methacrylate and 2.5 parts of alpha,alpha'-azodiisobutyronitrile in 250 parts of dioxane was evenly divided among four pressure bottles, which were flushed with nitrogen, capped and rotated in a water bath at 70° C. for twenty-two hours. The light brown colored solution was concentrated by warming at 100° C. and 18 to 20 mm. pressure to remove the dioxane, then at 2 to 4 mm. pressure to remove unreacted monomers. The sticky viscous polymer left was dissolved in 125 parts of diethyl ether and precipitated by adding this solution slowly with stirring to 600 parts of petroleum ether. The polymer was purified once more in a similar manner, then dissolved in dioxane. Evaporation of a test portion of this solution showed that it contained 79.6 grams of an allyl glycidyl ether/beta-diethylaminoethyl methacrylate copolymer, which was found by oxirane oxygen determination to contain 3.2% of polymerized allyl glycidyl ether. This copolymer crosslinked readily, either by heating at 144° C. for thirty minutes or by heating with a trace of phosphoric acid at 115° C. for fifteen minutes, to give a polymer which was no longer soluble in dioxane.

It will be understood that the above examples are merely illustrative and that the present invention broadly comprises the preparation of soluble addition-type copolymers, adapted to be crosslinked upon heating, by polymerization of a polymerizable mixture containing, as essential ingredients, (1) a polymerizable compound having a terminal glycidyl group attached to a terminal methylene group through an aliphatic group of one to three carbon atoms containing an oxygen linkage in the chain connecting the terminal groups, and (2) a polymerizable monoethylenically unsaturated monoamine having a basicity expressed by a pK base value below 6.0, and, as a new class of copolymers, those copolymers thus prepared which are free of hydroxyl groups. Suitable glycidyl monomers of the above class include glycidyl methacrylate, glycidyl acrylate, allyl glycidyl ether and 2-methallyl glycidyl ether.

It should be noted that the monomers of this class which contain a terminal glycidyl group, are far more suitable for the preparation of crosslinkable copolymers with unsaturated, strongly basic amines than are monomers in which the 1,2-epoxy group is internal rather than terminal. This much greater reactivity of the terminal 1,2-epoxy group can be shown, for example, by comparing the copolymers of Examples VII and VIII with a copolymer prepared in essentially the same manner from the same unsaturated amine, viz., beta-diethylaminoethyl methacrylate, but from an epoxy monomer in which the 1,2-epoxy group is internal, viz., 4-vinylcyclohexene monoepoxide. At substantially the same content of polymerized epoxy monomer, it is found that the copolymers of Examples VII and VIII are superior to the 4-vinylcyclohexene monoepoxide/beta-diethylaminoethyl methacrylate copolymer from the very important standpoints of ease of thermal crosslinking, ease of acid-catalyzed crosslinking and resistance of the crosslinked polymers to solvents, acids and alkali.

The polymerizable monoethylenically unsaturated monoamines of pK base value below 6.0 suitable for use in this invention include the beta-dimethylaminoethyl and beta-diethylaminoethyl esters of acrylic and methacrylic acids, and beta-vinyloxyethylamine. These monoamines, for example, beta-dimethylaminoethyl methacrylate (pK base value 5.74); beta-diethylaminoethyl methacrylate (pK base value 5.16); and beta-vinyloxyethylamine (pK base value 4.85) are strongly basic. Such monoamines react much more readily than weak monoamines do with the oxirane groups in the polymer to form a crosslinked polymer. These amines are aliphatic or acylic, that is, the amino nitrogen is acyclic, i.e., not a member of a cyclic structure. In comparison, cyclic monoamines of aromatic character are usually weakly basic, e.g., 2-vinylpyridine has a pK base value of 9.48. The proportion of the two essential components of these copolymers can be varied greatly but each should be present in an amount sufficient to give a copolymer which will crosslink on heating. Actually, copolymers containing 0.5% or even less, by combined weight of the two essential components, of either the polymerizable glycidyl compound or the polymerizable monoamine, will cross-link on heating. Preferably, the copolymer will contain at least 1% by weight of each essential component, that is, in a polymer primarily consisting of the two essential components, from about 1% to about 99% of each component. Still more preferred, because of the greater flexibility of the resulting films, are the copolymers containing between about 1% and 50%, by weight, of the polymerized glycidyl group-containing monomer. Such copolymers will readily crosslink to give products well adapted for the formation of water-and organic solvent-resistant films and coatings.

In preparing these copolymers, the proportion of the essential ingredients in the mixture of polymerizable ingredients likewise can be varied greatly. For example, from 1% to 99% each of the polymerizable compound containing the glycidyl group and the polymerizable monoamine can be used. As the examples illustrate, it is preferred to use about 2% to 90% of the glycidyl compound and 98% to 10% of the monoamine. Due to the different rates of polymerization of specific compounds, the proportion of each ingredient in the polymerizable mixture may vary appreciably from the proportion of that ingredient in the copolymer.

The copolymers of this invention are addition-type copolymers as contrasted to condensation-type copolymers and the instant process involves free radical-initiated polymerization. To obtain a soluble copolymer, i.e., one that is substantially free of crosslinking, it has been found that the type of free radical initiator used is apparently a critical factor. For example, the commonly used organic peroxide initiators are not suitable because they lead to premature crosslinking and/or other undesirable side reactions. So far as has been determined, the class of azo polymerization initiators is the only one suitable for use in the process of this invention. These azo polymerization catalysts are now well known in the art and they are disclosed in great detail in U.S. Patent No. 2,471,959 to Hunt.

Any specific member of the class of azo polymerization initiators can be used in this invention. The azonitriles such as alpha,alpha'-azodiisobutyronitrile; alpha,alpha'-azobis(alpha,gamma - dimethylvaleronitrile); dimethyl-alpha,alpha'-azodiisobutyrate; 1,1'-azodicyclohexanecarbonitrile; and the like, are particularly suitable for use in this process. The initiator need be used only in minor amounts, e.g., between 0.1% and 5% based on the total weight of polymerizable materials.

The polymerization should be carried out in a homogeneous, one-phase, fluid system since, if the resulting copolymer is not maintained in solution, premature crosslinking may take place. It is not essential to use an extraneous solvent as one or more of the polymerizable components can act as solvent for the polymer, particularly when the polymerization is interrupted before it is completed or far advanced. However, the use of an unpolymerizable organic solvent is generally desirable. For this purpose, it is preferred to use inert solvents, including aromatic hydrocarbons such as benzene, toluene, or the xylenes; ketones such as acetone, methyl ethyl ketone, methyl isobutyl ketone, or cyclohexanone; ethers having active solvent power such as di-n-butyl ether or dioxane; and the like. Other solvents which cannot be viewed as completely inert can be used, for example, alcohols such as ethanol, isopropyl alcohol, n-butyl alcohol or tertiary butyl alcohol. Solvents which are active chain-transfer agents such as isopropyl alcohol tend to lower the molecular weight of the copolymer produced and have special usefulness when this is desired. The amount of solvent, when one is used, is not critical and can vary within wide limits, for example, between 10% and 1000%, preferably between 50% and 500%, of the total weight of the monomers. Mixtures of solvents can be used if desired.

The polymerization temperature should not exceed about 120° C., as otherwise the danger of premature crosslinking of the polymer is too great. There is no critical lower limit on the temperature range, as some polymerization will take place at room temperature (about 20° C.) or even lower. To attain a practical speed of reaction, a temperature above 40° C. will normally be used, and a range of 50° C. to 120° C. is preferred. Atmospheric pressures are conveniently used, for example, in open vessels provided with a reflux condenser, but the reaction can also be carried out in closed vessels under the autogenous pressure of the reactants, and additional pressure can be applied if desired.

The copolymers can be isolated by various means, for example, simply by evaporating the unchanged monomers and solvent, if any, under reduced pressure, or by pouring the fluid reaction mixture into a non-solvent for the polymer. The polymer can be purified by redissolving it in an appropriate solvent and reprecipitating it in a non-solvent.

As has been shown, the copolymers obtainable by the process of this invention are particularly valuable in coating compositions because of their ability to crosslink rapidly to yield insoluble, resistant materials. This insolubilization mechanism does not depend on external, uncontrollable factors such as air-oxidation, but upon the internal structure of the copolymers. The copolymers are therefore useful as clear finishes for metals, wood, glass, ceramics, textiles, paper and other substrates and may be used either as primer-sealer coats for subsequent application of other finishes or as the total protective or decorative finish for these substrates. In addition to clear compositions, pigmented coating compositions are readily prepared by incorporating in the copolymer a wide variety of commonly used pigments, such as titanium dioxide, carbon black, iron blues, phthalocyanine blues and greens, metal oxides and chromates, organic maroons and various inert extenders such as talc, barytes and china clay. Other film-forming materials compatible with the copolymers and soluble in the same solvents may be blended with them to produce clear or pigmented compositions, including urea-formaldehyde resins, melamine-formaldehyde resins, alkyd resins and other natural and synthetic polymers. The copolymers obtainable by the process of this invention are further useful as pigment dispersing agents, pigment binders in the preparation of water paints and pigment printing compositions, and antistatic agents for natural or synthetic fabrics.

As many apparently widely different embodiments of this invention may be made without departing from the spirit and scope thereof, it is to be understood that the invention is not limited to the specific embodiments thereof except as defined in the appended claims.

What is claimed is:

1. A soluble linear copolymer composed of hydrocarbon chains having, as essential extralinear substituents, glycidyl-terminating and monoaminoalkoxy-terminating groups, any other oxygen-containing extralinear substituent being aliphatic and terminating in an alkyl group, said copolymer being converted to an insoluble crosslinked polymer by reaction of said glycidyl groups with said monoaminoalkoxy groups upon heating to 50° to 150° C., and wherein said copolymer consists of a polymerized mixture of 1% to 99% of a compound selected from the group consisting of the glycidyl ethers of allyl and methallyl alcohols and the glycidyl esters of acrylic and methacrylic acids, 1% to 99% of a compound selected from the group consisting of the beta-diethylaminoethyl and beta-dimethylaminoethyl esters of acrylic and methacrylic acids and beta-vinyloxyethylamine.

2. A copolymer as defined in claim 1 in which the monoamine monomer is beta-diethylaminoethyl methacrylate and the glycidyl group-containing monomer is glycidyl methacrylate.

3. The process for preparing a soluble addition-type copolymer, free of hydroxyl groups and adapted to be crosslinked to an insoluble condition on heating, which comprises heating together in a homogeneous, one-phase system in the presence of an azo polymerization initiator at a temperature below about 120° C., a polymerizable mixture of monoethylenically unsaturated compounds consisting of 0.5 to 99% of a compound selected from the group consisting of the glycidyl ethers of allyl and methallyl alcohols and the glycidyl esters of acrylic and methacrylic acids, 0.5 to 99% of a compound selected from the group consisting of the beta-diethylaminoethyl and beta-dimethylaminoethyl esters of acrylic and methacrylic acids and beta-vinyloxyethylamine.

4. Process as set forth in claim 3 wherein said liquid inert organic solvent is a liquid aromatic hydrocarbon and is present in an amount equal to about 50% to 100% of the total weight of the polymerizable ingredients.

5. Process of preparing a soluble addition-type copolymer adapted to be crosslinked upon heating, which comprises polymerizing in a liquid inert organic solvent in the presence of an azonitrile polymerization initiator at a temperature of 50° C. to 120° C. a polymerizable mixture, the polymerizable ingredients of which consist of, by total weight of said polymerizable ingredients, from 2% to 90% of a compound from the group consisting of the glycidyl ethers of allyl and methallyl alcohols and the glycidyl esters of acrylic and methacrylic acids, and from 98% to 10% of a compound from the group consisting of the beta-diethylaminoethyl and beta-dimethylaminoethyl esters of acrylic and methacrylic acids and beta-vinyloxyethylamine.

References Cited in the file of this patent

UNITED STATES PATENTS

| | | |
|---|---|---|
| 2,138,763 | Graves | Nov. 29, 1938 |
| 2,604,463 | Bilton et al. | July 22, 1952 |
| 2,687,404 | Robertson | Aug. 24, 1954 |
| 2,737,496 | Catlin | Mar. 6, 1956 |
| 2,781,335 | Cupery | Feb. 12, 1957 |